United States Patent
Wiechert

[15] 3,671,554
[45] June 20, 1972

[54] 20,20-ETHYLENE-21-OXOSTEROIDS

[72] Inventor: Rudolf Wiechert, Berlin, Germany

[73] Assignee: Schering Aktiengesellschaft, Berlin, Germany

[22] Filed: July 16, 1970

[21] Appl. No.: 55,592

[30] Foreign Application Priority Data

July 16, 1969 Germany..................P 19 37 062.8
Aug. 13, 1969 Germany..................P 19 41 604.7

[52] U.S. Cl..................260/397.3, 260/397.45, 260/397.47, 260/999
[51] Int. Cl......................................................C07c 169/34
[58] Field of Search..................../Machine Searched Steroids

[56] References Cited
UNITED STATES PATENTS 3,262,948   7/1966   Lehmann..........................260/397.3

*Primary Examiner*—Henry A. French
*Attorney*—Millen, Raptes & White

[57] ABSTRACT

20,20-Ethylene-21-oxosteroids of the formula

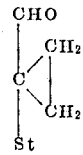

which are useful as intermediates in the production of cardioactive steroids having a lactone at the 17-position, are produced by reacting a 20-keto-21-sulfonyloxy steroid with dimethyl-sulfoxonium methylide.

29 Claims, No Drawings

20,20-ETHYLENE-21-OXOSTEROIDS

BACKGROUND OF THE INVENTION

This invention relates to novel 20,20-ethylene-21-oxosteroids and to a process for their production.

SUMMARY OF THE INVENTION

According to this invention, novel 20,20-ethylene-21-oxosteroids of the formula

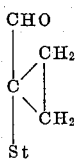

I wherein St is a steroid residue attached at carbon atom 17, are produced by a process in which a steroid of the formula

II wherein Z is a chlorine or bromine atom or a sulfonyloxy group and St has the value given above, is reacted with dimethyl-sulfoxonium methylide in the presence of an organic solvent.

DETAILED DISCUSSION

The term "steroid residue" embraces all cyclopentanopolyhydrophenanthrenes having a 20,20-ethylene-21-oxo side chain attached to the 17-position carbon atom, e.g., steroid of the estrane, androstane, etiocholane, pregnane and allopregnane natural and synthetic series. Either or both of the angular methyl groups at the 10 and 13 -positions can be present, absent or replaced by polycarbon-lower-alkyl, e.g., ethyl, isopropyl, n-propyl. Included are synthetic racemic mixtures or a separated d or l optically active isomer can be employed, as well as the steroids of the natural, optically active series. Other products within the scope of this invention are, for example:

3β-acetoxy-20.20-ethylene-5α-pregnane-21-al,
17-hydroxy-3β-acetoxy-20.20-ethylene-5α-pregnane-21-al,
3β-acetoxy-20.20-ethylene-5-pregnene-21-al,
17-hydroxy-3β-acetoxy-20.20-ethylene-5α-pregnane-21-al,
20.20-ethylene-5α-pregnane-21-al,
20.20-ethylene-5β-pregnane-21-al,
3-oxo-20.20-ethylene-5α-pregn-1-ene-21-al,
17-hydroxy-3-oxo-5α-pregn-1-ene-21-al,
3-oxo-6α-methyl-20.20-ethylene-4-pregnene-21-al,
17-hydroxy-3-oxo-6α-methyl-20.20-ethylene-4-pregnene-21-al,
3-oxo-20.20-ethylene-1.4.6-pregnatriene-21-al,
17-hydroxy-3-oxo-1α.2α-methylene-20.20-ethylene-4-pregnene-21-al,
17-hydroxy-3-oxo-1α.2α-methylene-20.20-ethylene-4.6-pregnadiene-21-al,
17-hydroxy-3.11-dioxo-20.20-ethylene-4-pregnene-21-al,
17-hydroxy-3.11-dioxo-20.20-ethylene-1.4-pregnadiene-21-al,
11β.17-dihydroxy-3-oxo-20.20-ethylene-1.4-pregnadiene-21-al,
11β.17-dihydroxy-3-oxo-16α-methyl-20.20-ethylene-1.4-pregnadiene-21-al,
9-fluoro-17-hydroxy-3.11-dioxo-20.20-ethylene-1.4-pregnadiene-21-al.

The sulfonyloxy group at the 21-position of the starting steroids (II) can be any sulfonyloxy ester of a 20-keto-21-hydroxy steroid of the formula $St-CO-CH_2-O_2S-R'$. Preferred are those wherein R' is a hydrocarbon radical, especially those containing from one to twelve carbon atoms, inclusive. Particularly preferred are the $R'-SO_2-$ radicals which are monocyclic hydrocarbon-arylsulfonyl radicals containing from six to 12carbon atoms, inclusive, i.e., benzenesulfonyl and hydrocarbon (e.g., alkyl) substituted benzenesulfonyl radicals. Starting compounds for the process of the present invention wherein Z is the para-tosyloxy or mesyloxy are especially preferred.

Examples of the starting compounds of the present invention are those of Formula II wherein the sulfonyloxy group is arylsulfonyloxy, e.g., benzenesulfonyloxy, para-toluenesulfonyl-oxy, m,m'-diemthylbenzenesulfonyloxy, o,o'-dimethylbenzene-sulfonyloxy, sym.-trimethylbenzenesulfonyloxy, sym.-triethyl-benzenesulfonyloxy, m-ethylbenzenesulfonyloxy, para-isopropyl-benzenesulfonyloxy, m-n-butylbenzenesulfonyloxy, p-n-amyl-benzenesulfonyloxy, p-n-hexylbenzenesulfonyloxy, p-n-heptyl-benzenesulfonyloxy, p-n-octylbenzenesulfonyloxy, α-naphthene-sulfonyloxy, β-naphthenesulfonyloxy, or is methylsulfonyloxy, ethylsulfonyloxy, propylsulfonyloxy, isopropylsulfonyloxy, butylsulfonyloxy, tert.-butylsulfonyloxy, isoamylsulfonyloxy, hexylsulfonyloxy, heptylsulfonyloxy, octylsulfonyloxy, α-pyridinesulfonyloxy, α-pyranesulfonyloxy, α-thiophene-sulfonyloxy, α-furansulfonyloxy, α-tetrahydrofuransulfonyloxy, or other alkyl-, carbocyclic and heterocyclic aryl-, alkaryl- and aralkyl-sulfonyloxy group, preferably one containing 1–12, preferably 1–8, carbon atoms and 0–2, preferably 0–1N, S or O hetero atoms, which are preferably ring carbon atoms, in the R' group.

The process of this invention is not affected by substituents in the A, B, C. and/or D rings of the steroid nucleus St. Examples of substituents which can be present in the starting compounds and reaction products of the process of this invention are a keto group, e.g., in the 3-, 6- and/or 11-position; a free, esterified, or etherified hydroxyl group, e.g., in the 1-, 3-, 6-, 11- and/or 17-position; an alkyl, preferably lower-alkyl and most preferably methyl, group, e.g., in the 1-, 2-, 4-, 6-, 7-, 16- and/or 18-position; a methylene group, e.g., in the 1,2-, 6,7- and/or 16,17-position; and a halogen atom, preferably a fluorine or chlorine atom, e.g., in the 2-, 4-, 6-, 7-, 9- and/or 16-position.

Other groups which may be present in the steroid nucleus are epoxy, endomethylene, hydrocarbonoxy, especially methoxy, ethoxy and benzyloxy. In addition to keto and hydroxy groups, there can be groups hydrolyzable thereto, e.g., dialkyl ketal, alkylene glycol, e.g., ethylene glycol, ketal, enol acylate, e.g., enolacetate, enol ether, enamine, e.g., pyrrolidyl enamine, acyloxy, e.g., formyloxy, acetoxy, propionyloxy, butyryloxy, dimethylacetoxy, trimethylacetoxy, valeryloxy, hexanoyloxy, octanoyloxy, β-cyclopentylpropionyloxy, diethyl-acetoxy, benzoxy, phenylacetoxy, phenylpropionyloxy, succinoyloxy, phthaloyloxy, and the like, aryl- or alkyl-sulfonyloxy, e.g., tosyloxy and mesyloxy and the like.

It will be apparent to those skilled in the art that not all substituents on the steroid nucleus will remain unchanged in the process of this invention. For example, especially reactive halogen atoms, such as chlorine, bromine, or iodine adjacent to a keto or hydroxyl group can be partially attacked. However, the reaction of this invention is not impaired thereby. Moreover, groups which are altered can be restored by means known in the art. For example, it is possible to convert an epoxide produced from a chlorohydrin back into the chlorohydrin with lithium chloride and acetic acid.

Rings A, B, C, and D of the steroid nucleus can be saturated or unsaturated, any double bonds therein preferably being in the 1,2-, 4,5-, 5,6-, 7,8-, 9,11- and/or 16,17-position.

Preferred products of the process of this invention are compounds of the formula

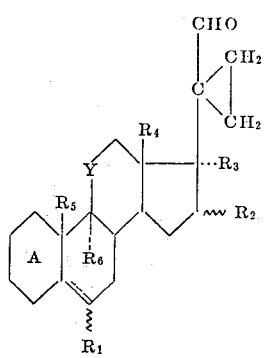

wherein Ring A is one of

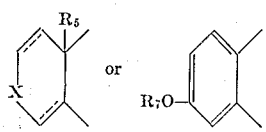

wherein $R_1$ and $R_2$ each represent a hydrogen atom, a halogen atom, or a methyl group; $R_3$ is a hydrogen atom or a hydroxyl group; $R_4$ is a lower-alkyl group, preferably a methyl or ethyl group; $R_5$ is a hydrogen atom or the methyl group; $R_6$ is a hydrogen, fluorine, or chlorine atom; X is $>CH_2$, $>C=O$ or $CHOR_7$, wherein $R_7$ is hydrogen or lower alkanoyl; and Y is $>CH_2$, $>CHOH$ or $>C=O$, and wherein the carbon-carbon bonds in the 1(2)-, 4(5)- or 5(6)-position can be single or double bonds.

The preferred products of this invention are produced by the reaction of dimethylsulfoxonium methylide with a 21-sulfonyl-oxy ester of a 20-keto-21-hydroxy steroid of Formula II wherein St is a steroid nucleus of the formula

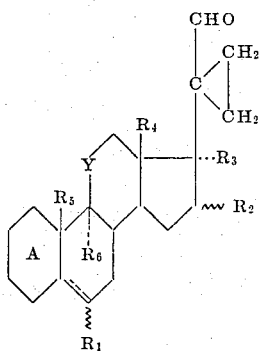

wherein Ring A is one of

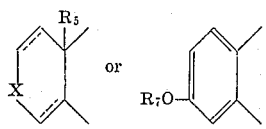

wherein $R_1$, $R_2$, $R_3$, $R_4$, $R_5$, $R_6$, $R_7$, X and Y have the values given above.

In carrying out the process of this invention, the di-methylsulfoxonium methylide preferably is prepared fresh in each instance. A preferred embodiment resides in first preparing a dimethylsulfoxonium methylide solution in a conventional manner. For this purpose, trimethylsulfoxonium iodide is mixed, for example, in dimethyl sulfoxide in the presence of an anhydrous base, such as, for example, sodium or potassium hydroxide, sodium or potassium methylate, or potassium tert.-butylate or sodium hydride. The reaction mixture is then allowed to react, preferably with stirring, at room temperature for about 45 minutes. The starting steroid II, preferably one of Formula III, is then added to the thus-prepared dimethylsulfoxonium methylide solution. The molar ratio of the reactants is selected so that the dimethylsulfoxonium methylide is preferably present in the reaction mixture in a slight excess to ensure complete reaction of the starting steroid. The process of this invention preferably is conducted at about room temperature, e.g., about 18° to 30° C., but lower or higher reaction temperatures, can be employed. However, optimum yields of desired product and/or reaction rates may not be realized. To avoid undesired side reactions, the reaction preferably is conducted in the absence of atmospheric oxygen, e.g., in the presence of an atmosphere of a protective inert gas. Suitable as protective gases are, for example, nitrogen, argon and helium. According to the preferred embodiment, the dimethyl sulfoxide employed for the production of the dimethylsulfoxonium methylide solution also serves as the solvent for conducting the process of this invention. However, the reaction is not limited to the use of dimethyl sulfoxide as the solvent. Any conventional inert solvent can be used, particular examples being benzene, dimethylformamide, tetrahydrofuran, hexamethylphosphorus-acidtriamide.

The novel products of the process contain two extremely reactive groups, viz., the aldehyde group and the 3-carbon atom ring in the 20-position, which readily can be converted into a lactone ring. Such lactone rings in the 17-position are an important structural element of the cardiac steroids but heretofore were accessible only with difficulty. Thus, the products of the process are valuable intermediates for the synthesis of cardioactive steroids.

The compounds of this invention also have prostatic involution activity and can be used, for example, in the treatment of hypertrophy of the prostrate by oral or parenteral administration of an effective amount of a compound of Formula I in admixture with a conventional pharmaceutical carrier. In animal studies, 3-oxo-20,20-ethylene-4-pregnene-21-al demonstrated prostatic involution activity without influencing the growth of the testes.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

41.75 g. of trimethylsulfoxonium iodide are stirred in 800 ml. of dimethyl sulfoxide with 7.6 g. of pulverized sodium hydroxide for 45 minutes at room temperature. Then, 31 g. of 21-mesyloxy-4-pregnene-3,20-dione are added to the thus-prepared dimethylsulfoxonium methylide solution, and the reaction mixture is stirred for 30 minutes at room temperature in a nitrogen atmosphere. Thereafter, the reaction mixture is stirred into weakly acidic ice water. The thus-produced precipitate is filtered off, washed with water, taken up in methylene chloride, and dried. After evaporation, the residue is chromatographed on silica gel and, after recrystallization from ethyl acetate, 7.3 g. of 3-oxo-20,20-ethylene-4-pregnen-21-al are obtained, m.p. 172.5° – 181° C., UV: $\epsilon_{241}$ = 16,500.

When conducting the same experiment without the exclusion of atmospheric oxygen, the product of the process is obtained in a yield of 5.2 g.

EXAMPLE 2

4.9 g. of 21-tosyloxy-4-pregnene-3,20-dione are reacted, as described in Example 1, with the dimethylsulfoxonium methylide produced by the reaction of 5.5 g. of trimethyl-sulfoxonium iodide with 1.0 g. of pulverized sodium hydroxide in 70 ml. of dimethyl sulfoxide, and worked up. After chromatographing on silica gel and recrystallization from ethyl acetate, 250 mg. of 3-oxo-20,20-ethylene-4-pregnen-21-al are obtained, m.p. 166°–175° C. UV: $\epsilon_{241}$ = 16,200.

EXAMPLE 3

4.1 g. of 21-mesyloxy-5β-pregnane-3,20-dione are reacted, as described in Example 1, with the dimethylsulfoxonium methylide produced by the reaction of 5.5 g. of trimethylsulfoxonium iodide with 1.0 g. of pulverized sodium hydroxide in 70 ml. of dimethyl sulfoxide, and worked up. After chromatography on silica gel and recrystallization from isopropyl ether, 460 mg. of 3-oxo-20,20-ethylene-5β-pregnan-21-al are obtained, m.p. 142°–145° C.

EXAMPLE 4

4.22 g. of 21-mesyloxy-16α-methyl-4-pregnene-3,20-dione are reacted with the dimethylsulfoxonium methylide produced by the reaction of 5.5 g. of trimethylsulfoxonium iodide with 1.0 g. of pulverized sodium hydroxide in 70 ml. of dimethyl sulfoxide, as described in Example 1, and worked up. After chromatography on silica gel and after recrystallization from isopropyl ether, 700 mg. of 3-oxo-16α-methyl-20,20-ethylene-4-pregnen-21al are obtained, m.p. 127.5° – 130.5° C. UV: $\epsilon_{241} = 16,700$.

EXAMPLE 5

3.5 g. of 6α-fluoro-11β-hydroxy-21-mesyloxy-16α-methyl-1,4-pregnadiene-3,20-dione are reacted with the dimethylsulfoxonium methylide produced by the reaction of 4.37 g. of trimethylsulfoxonium iodide and 795 mg. of sodium hydroxide in 80 ml. of dimethyl sulfoxide, as described in Example 1, and worked up. After chromatography on silica gel and after recrystallization from isopropyl ether/methylene chloride, 485 mg. of 6α-fluoro-11β-hydroxy-3-oxo-16α-methyl-20,20-ethylene-1,4-pregnadien-21-al are obtained, m.p. 210°–214 °C. UV: $\epsilon_{242} = 15,500$.

EXAMPLE 6

4.25 g. of 17-hydroxy-21-mesyloxy-4-pregnene-3,20-dione are reacted, as described in Example 1, with the dimethylsulfoxonium methylide produced by the reaction of 5.5 g. of trimethylsulfoxonium iodide and 1.0 g. of pulverized sodium hydroxide in 90 ml. of dimethyl sulfoxide, and worked up. After chromatography on silica gel and recrystallization from isopropyl ether/methylene chloride, 105 mg. of 17-hydroxy-3-oxo-20,20-ethylene-4-pregnen-21-al are obtained, m.p. 203.5° – 205.5° C. (decomposition). UV: $\epsilon_{241} = 16,100$.

EXAMPLE 7

11 g. of 11β, 17-dihydroxy-21-mesyloxy-4-pregnene-3,20-dione are reacted within 5 minutes, as described in Example 1, with the dimethylsulfoxonium methylide produced by the reaction of 13.75 g. of trimethylsulfoxonium iodide and 2.5 g. of sodium hydroxide in 200 ml. of dimethyl sulfoxide, and worked up. After chromatography on silica gel and recrystallization from isopropyl ether/methylene chloride, 170 mg. of 11β,17-di-hydroxy-3-oxo-20,20-ethylene-4-pregnen-21-al are obtained, m.p. 187°–190° C. (decomposition); UV: $\epsilon_{242} = 16,000$.

EXAMPLE 8

4.7 g. of 3,17-dihydroxy-21-mesyloxy-19-nor-1,3,5(10)-pregnatrien-20-one are reacted within 5 minutes, as described in Example 1, with the dimethylsulfoxonium methylide produced by the reaction of 6.3 g. of trimethylsulfoxonium iodide and 1.145 g. of sodium hydroxide in 80 ml. of dimethyl sulfoxide, and worked up. After chromatography on silica gel and recrystallization from ethyl acetate, 290 mg. of 3,17-dihydroxy-20,20-ethylene-19-nor-1,3,5(10)-pregnatriene-21-al are obtained, m.p. 227.5° – 232° C.

EXAMPLE 9

9.7 g. of 17-hydroxy-21-mesyloxy-19-nor-4-pregnene-3,20-dione are reacted within 5 minutes, as described in Example 1, with the dimethylsulfoxonium methylide produced by the reaction of 13 g. of trimethylsulfoxonium iodide and 2.36 g. of sodium hydroxide in 150 ml. of dimethyl sulfoxide, and worked up. After chromatography on silica gel and recrystallization from ethyl acetate, 350 mg. of 17-hydroxy-3-oxo-20,20-ethylene-19-nor-4-pregnen-21-al are obtained, m.p. 176°–177.5° C.; UV: $\epsilon_{240} = 16,800$.

EXAMPLE 10

3.31 g. of trimethylsulfoxonium iodide are mixed in 60 ml. of dimethyl sulfoxide with 602 mg. of pulverized sodium hydroxide and stirred for 45 minutes at room temperature. Then, 2.1 g. of 21-chloro-4-pregnene-3,20-dione are added, and the reaction mixture is stirred for 30 minutes at room temperature, with the introduction of nitrogen. Thereafter, the mixture is stirred into a weakly acidic mixture of acetic acid and ice water, and the thus-produced precipitate is vacuum-filtered, washed with water, dissolved in methylene chloride, and dried over sodium sulfate. The residue obtained after evaporation is chromatographed on silica gel and, after recrystallization from ethyl acetate, 460 mg. of 3-oxo-20,20-ethylene-4-pregnen-21-al are obtained, m.p. 171.5° – 179° C. UV: $\epsilon_{241} = 16,800$.

EXAMPLE 11

3.95 g. of 21-bromo-4-pregnene-3,20-dione are reacted, as described in Example 1, with the dimethylsulfoxonium methylide produced by the reaction of 5.5 g. of trimethylsulfoxonium iodide and 1 g. of sodium hydroxide in 80 ml. of dimethyl sulfoxide, and worked up. After chromatography on silica gel and recrystallization from isopropyl ether, 270 mg. of 3-oxo-20,20-ethylene-4-pregnen-21-al are obtained, m.p. 170°–178° C.; UV: $\epsilon_{241} = 16,500$.

EXAMPLE 12

1.75 g. of 21-chloro-5β-pregnane-3,20-dione are reacted, as described in Example 1, with the dimethylsulfoxonium methylide produced by the reaction of 2.25 g. of trimethylsulfoxonium iodide and 500 mg. of sodium hydroxide in 30 ml. of dimethyl sulfoxide, and worked up. After chromatography on silica gel and after recrystallization from isopropyl ether, 150 mg. of 3-oxo-20,20-ethylene-5β-pregnan-21-al are obtained, m.p. 141°–143° C.

EXAMPLE 13

2 g. of 21-bromo-5β-pregnane-3,20-dione are reacted, as described in Example 1, with the dimethylsulfoxonium methylide produced by the reaction of 2.25 g. of trimethylsulfoxonium iodide and 500 mg. of sodium hydroxide in 30 ml. of dimethyl sulfoxide, and worked up. After chromatography on silica gel and recrystallization from isopropyl ether, 80 mg. of 3-oxo-20,20-ethylene-5β-pregnan-21-al are obtained, m.p. 141.5°–143° C.

EXAMPLE 14

5.0 g. of 21-chloro-16α-methyl-4-pregnene-3,20-dione are reacted, as described in Example 1, with the dimethylsulfoxonium methylide produced by the reaction of 8.6 g. of trimethylsulfoxonium iodide and 1.76 g. of sodium hydroxide in 90 ml. of dimethyl sulfoxide, and worked up. After chromatography on silica gel and recrystallization from isopropyl ether, 690 mg. of 3-oxo-16α-methyl-20,20-ethylene-4-pregnen-21-al are obtained, m.p. 126°–129° C.; UV: $\epsilon_{241} = 16,500$.

EXAMPLE 15

4.07 g. of 21-bromo-16α-methyl-4-pregnene-3,20-dione are reacted, as described in Example 1, with the dimethylsulfoxonium methylide produced by the reaction of 5.5 g. of trimethylsulfoxonium iodide and 1.0 g. of sodium hydroxide in 70 ml. of dimethyl sulfoxide, and worked up. After chromatography on silica gel and recrystallization from isopropyl ether, 270 mg. of 3-oxo-16α-methyl-20,20-ethylene-4-pregnen-21-al are obtained, m.p. 125°–126.5° C.; UV: $\epsilon_{241}$ = 16,400.

EXAMPLE 16

3.95 g. of 6α-fluoro-21-chloro-11β-hydroxy-16α-methyl-1,4-pregnadiene-3,20-dione are reacted, as described in Example 1, with the dimethylsulfoxonium methylide produced by the reaction of 5.5 g. of trimethylsulfoxonium iodide and 1.0 g. of sodium hydroxide in 100 ml. of dimethyl sulfoxide, and worked up. After chromatography on silica gel and recrystallization from ethyl acetate, 460 mg. of 6α-fluoro-11β-hydroxy-3-oxo-16α-methyl-20,20-ethylene-1,4-pregnadien-21-al are obtained, m.p. 210° – 213.5° C.; UV: $\epsilon_{242}$ = 15,600.

EXAMPLE 17

3.0 g. of 21-chloro-17-hydroxy-4-pregnene-3,20-dione are reacted, as described in Example 1, with the dimethyl-sulfoxonium methylide produced by the reaction of 5.14 g. of trimethylsulfoxonium iodide and 822 mg. of sodium hydroxide in 70 ml. of dimethyl sulfoxide, and worked up. After chromatography on silica gel and recrystallization from isopropyl ether/methylene chloride, 85 mg. of 17-hydroxy-3-oxo-20,20-ethylene-4-pregnen-21-al are obtained, m.p. 201°–203° C. (decomposition). UV: $\epsilon_{241}$ = 16,100.

EXAMPLE 18

6.5 g. of 21-chloro-3β-acetoxy-5β-pregnan-20-one are reacted, as described in Example 10, with the dimethylsulfoxonium methylide produced by the reaction of 9.1 g. of trimethylsulfoxonium iodide and 1.66 g. of sodium hydroxide in 180 ml. of dimethyl sulfoxide, and worked up. After chromatography on silica gel and recrystallization from pentane, 780 mg. of 3β-acetoxy-20,20-ethylene-5β-pregnan-21-al are obtained, m.p. 99°–100° C.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A 20,20-ethylene-21-oxosteroid of the formula

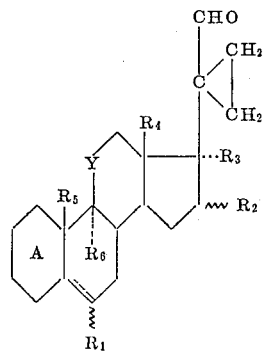

wherein Ring A is one of

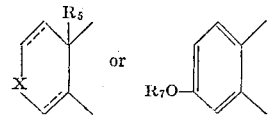

$R_1$ and $R_2$ each are a hydrogen atom, a halogen atom, or a methyl group; $R_3$ is a hydrogen atom or a hydroxyl group; $R_4$ is a lower-alkyl group; $R_5$ is a hydrogen atom or a methyl group; $R_6$ is a hydrogen, fluorine or chlorine atom; X is $>CH_2$, $>C=O$ or $>CHOR_7$, wherein $R_7$ is hydrogen or lower alkanoyl; Y is $>CH_2$, $>CHOH$ or $>C=O$; and wherein the carbon-carbon bonds in the 1(2)-, 4(5)- and 5(6)-positions are single or double bonds.

2. A compound of claim 1 wherein $R_1$ is hydrogen or halogen; $R_2$ is hydrogen or methyl; $R_4$ is ethyl or methyl; X is $C=O$ or $CH—O—R_7$; and the carbon-to-carbon bond in the 5(6) position is a single bond.

3. A compound of claim 1 wherein $R_1$ is hydrogen or alpha-halogen.

4. A compound of claim 1 wherein $R_1$ is hydrogen or fluorine.

5. A compound of claim 1 wherein $R_1$ is alpha-fluorine.

6. A compound of claim 1 wherein $R_2$ is hydrogen or alpha-methyl.

7. A compound of claim 1 wherein $R_4$ is methyl.

8. A compound of claim 1 wherein Y is $CH_2$ or CHOH.

9. A compound of claim 1 wherein $R_7$ is lower alkanoyl.

10. A compound of claim 1 wherein $R_7$ is acetyl.

11. A compound of claim 1, 3-oxo-20,20-ethylene-4-pregnen-21-al.

12. A compound of claim 1, 3-oxo-20,20-ethylene-5β-pregnan-21-al.

13. A compound of claim 1, 3-oxo-16α-methyl-20,20-ethylene-4-pregnen-21-al.

14. A compound of claim 1, 6α-fluoro-11β-hydroxy-3-oxo-16α-methyl-20,20-ethylene-1,4-pregnadien-21-al.

15. A compound of claim 1, 17-hydroxy-3-oxo-20,20-ethylene-4-pregnen-21-al.

16. A compound of claim 1, 11β,17-dihydroxy-3-oxo-20,20-ethylene-4-pregnen-21-al.

17. A compound of claim 1, 3,17-dihydroxy-20,20-ethylene-19-nor-1,3,5(10)-pregnatrien-21-al.

18. A compound of claim 1, 17-hydroxy-3-oxo-20,20-ethylene-19-nor-4-pregnen-21-al.

19. A compound of claim 1, 3β-acetoxy-20,20-ethylene-5β-pregnan-21-al.

20. A process for the production of a 20,20-ethylene-21-oxosteroid of claim 1 which comprises reacting a steroid of the formula $$\begin{array}{c} CH_2Z \\ | \\ C=O \\ | \\ St \end{array}$$

wherein Z is chlorine, bromine, or a sulfonyloxy group, and St represents a cyclopentanopolyhydrophenanthrene nucleus attached at its 17-position carbon atom, with dimethylsulfoxonium methylide.

21. A process according to claim 20 wherein St is a steroid nucleus of the formula

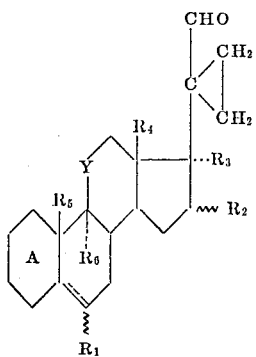

wherein Ring A is one of

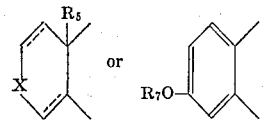

22. A process according to claim 20 wherein the reaction is conducted in dimethyl sulfoxide.

23. A process according to claim 20 wherein the reaction is conducted in an inert atmosphere.

24. A process according to claim 20 wherein the starting steroid is added to the reaction mixture obtained by the reaction of dimethylsulfoxonium iodide with a base in dimethyl sulfoxide.

25. A process according to claim 24 wherein the base is sodium hydroxide.

26. A process according to claim 20 wherein Z is mesyloxy or tosyloxy.

27. A process according to claim 21 wherein Z is mesyloxy or tosyloxy.

28. A process according to claim 21 wherein the reaction is conducted in an inert atmosphere and wherein the starting steroid is added to the reaction mixture obtained by the reaction of dimethyl sulfoxonium iodide with a base in dimethyl sulfoxide.

29. A process according to claim 28 wherein Z is mesyloxy or tosyloxy.

* * * * *